United States Patent [19]

Lippmann et al.

[11] Patent Number: 4,496,972
[45] Date of Patent: Jan. 29, 1985

[54] METHOD FOR THE REPRESENTATION OF VIDEO IMAGES OR SCENES, IN PARTICULAR AERIAL IMAGES TRANSMITTED AT REDUCED FRAME RATE

[75] Inventors: K. Reiner Lippmann; K. Heinrich W. Dörgeloh, both of Brunswick, Fed. Rep. of Germany

[73] Assignee: Deutsche Forschungs-und Versuchsanstalt fur Luft-und Raumfahrt e.v., Cologne, Fed. Rep. of Germany

[21] Appl. No.: 438,537

[22] Filed: Nov. 1, 1982

Related U.S. Application Data

[63] Continuation-in-part of Ser. No. 262,214, May 8, 1981.

[30] Foreign Application Priority Data

May 10, 1980 [DE] Fed. Rep. of Germany ....... 3018329
Nov. 3, 1981 [DE] Fed. Rep. of Germany ....... 3144050

[51] Int. Cl.$^3$ .......................... H04N 7/12; H04N 7/18
[52] U.S. Cl. .........................................358/109; 358/136
[58] Field of Search ............... 358/105, 109, 133, 135, 358/136, 138, 222

[56] References Cited

U.S. PATENT DOCUMENTS

| | | | |
|---|---|---|---|
| 4,060,832 | 11/1977 | Devineux et al. | 358/133 |
| 4,202,011 | 5/1980 | Koga | 358/136 |
| 4,218,703 | 8/1980 | Netravali et al. | 358/136 |
| 4,270,143 | 5/1981 | Morris | 358/125 |
| 4,383,272 | 5/1983 | Netravali et al. | 358/136 |

OTHER PUBLICATIONS (M. L. Hershberger, R. J. Vanderkolk "Video Image Bandwidth Reduction/Compression Studies for Remotely Piloted Vehicles", Final Tech. Rep., Jan. 1975-May 1976, pp. 6, 20-22, 56, 58, 81-91, and 97-99, ASD-Tr 76-26, AD-A039762, Hughes Aircraft Co., Culver City, Calif. 90230, Oct. 1976).

*Primary Examiner*—Joseph A. Orsino, Jr.
*Attorney, Agent, or Firm*—Gottlieb, Rackman & Reisman

[57] ABSTRACT

A method and an apparatus for the representation of video images or scenes, in particular aerial images with a relative movement between a pick-up sensor and the scene transmitted at reduced frame rate. Intermediate frames are reconstructed to be inserted between two transmitted frames, said reproduction starting from a small number of distinct corresponding reference points in the two transmitted frames, said reference points being situated in different vertical and horizontal coordinates within each of said two transmitted frames, and being determined by correlation of image point location within said transmitted frames calculating for each picture element in said intermediate frames the locations of the corresponding picture elements in each of said two transmitted frames and determining the value of the intensity for each picture element of said intermediate frame by interpolation and/or extrapolation and issuing said value. One of said two transmitted frames can be represented as a still picture for a certain period of time followed or preceded by a series of reconstructed intermediate frames providing a moving picture.

7 Claims, 4 Drawing Figures

METHOD FOR THE REPRESENTATION OF VIDEO IMAGES OR SCENES, IN PARTICULAR AERIAL IMAGES TRANSMITTED AT REDUCED FRAME RATE

This application is a continuation-in-part of Ser. No. 262,214, filed May 8, 1981.

The invention relates to a method for the representation of video images or scenes, in particular aerial images with a relative movement between a pick-up sensor and the scene transmitted at reduced frame rate.

BACKGROUND OF THE INVENTION

The task of improving and designing efficient and reliable RF systems for the noise-resistant transmission of moving video aerial scenes, especially from remotely piloted vehicles (RPVs) to ground stations, motivates an increasing interest in suitable techniques for reducing the bit rate in the digital TV baseband. Major candidate techniques, as reviewed by Camana (1979, IEEE Spectrum 16, 24-29) are based on transform or DPCM image coding, operating at the range of approximately 1 to 2 bits per picture element (pel), transmitted either at the standard or a lower TV frame rate.

As aerial scenes transmitted at standard frame rate, e.g. 25 frame/s, often show a largely overlapping image content of subsequent frames, the use of a lower frame rate is capable of providing low-complex, efficient transmissions with a relatively high degree of bit rate reduction, such as by a factor of 25 or more. However, to the human eye, the frame-to-frame discontinuity of the displayed scene movement (jerkiness), usually present in frame-repeated images, is annoying. On the other hand, the scene movement during the interval between successive transmitted frames is largely determined, so that a priori knowledge exists which can be utilized for a regeneration of the continuous scene movement in the received image sequence.

DESCRIPTION OF THE PRIOR ART

A method described by Hershberger and Vanderkolk (M. L. Hershberger, R. J. Vanderkolk "Video Image Bandwith Reduction/Compression Studies for Remotely Piloted Vehicles", Final Tech. Rep. January 1975-May 1976, ASD-Tr76-26, AD-AO39762, Hughes Aircraft Co., Culver City, Calif. 90230, October 1976), for example, shifts the image displayed during the time interval between one transmitted frame and the next, uniformly in accordance to the sensor movement, based on received flight data. The image is updated by the next transmitted frame.

Object movements within the background of the image are not appearing in this case. In addition, there is a disadvantage that due to the image shift, regions uncovered by the image occur to an increasing degree and these gradually limit the field of vision and are, in each case, only refilled when the image of the next transmitted frame is read-in and appears on the display. The information required on the reception side for calculation of the image shift is obtained from transmitted data of measurements on the aircraft and parameters of the system for picking-up the image.

It is an object of the invention to provide a method and apparatus which with the transmission of images, in particular aerial images or scenes, at reduced frame rates makes it possible to represent a continuous scene movement, whereby the image displayed is filling the field of vision of a display substantially completely also during the time interval between two successive transmitted frames.

SUMMARY OF THE INVENTION

In accordance with the present invention intermediate frames are constructed to be inserted between two transmitted frames, said reproduction starting from a small number of distinct corresponding reference points in the two transmitted frames, said reference points being situated in different vertical and horizontal coordinates within each of said two transmitted frames, and being determined by correlation of image point locations within said transmitted frames calculating for each picture element in said intermediate frames the locations of the corresponding picture elements in each of said two transmitted frames and determining the value of the intensity for each picture element of said intermediate frame by interpolation and/or extrapolation and issuing said value.

In accordance with the present invention there can one of said two transmitted frames be represented as a still picture for a certain period of time followed or preceded by a series of reconstructed intermediate frames providing a moving picture.

DESCRIPTION OF THE DRAWING

The present invention will be more readily appreciated by reference to the following detailed description when read in light of the accompanying drawing in which.

DETAILED DESCRIPTION

Figure 1:
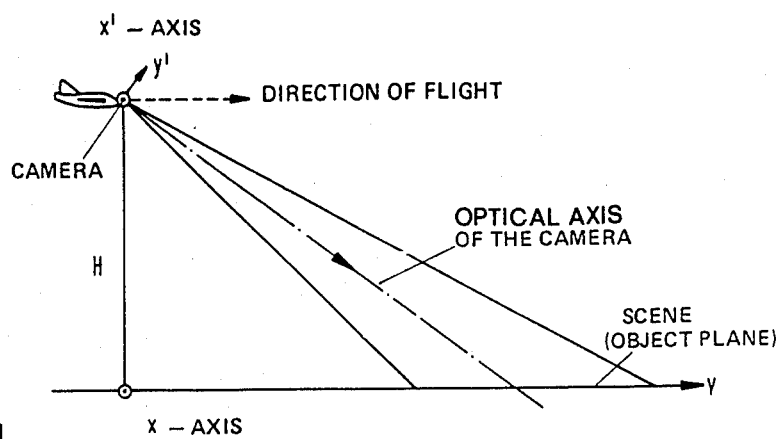
FIG. 1 shows the general geometric system for obtaining aerial TV image sequences from a height H above the ground with the TV camera directed obliquely forward (the x- and x'-axes are perpendicular to the plane of the drawing)
Figure 2:
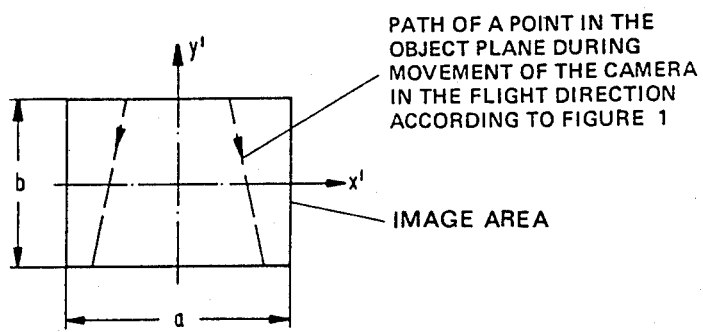
FIG. 2 shows the x-y plane of the aerial scene (scanned ground area) projected into the x'-y' plane of the image area viewed in the flight direction according to FIG. 1.

In the general geometric system according to FIG. 1, aerial image sequences are obtained by a preferably stabilized image sensor (camera) with an oblique depression angle moving over the x y object plane parallel to the y axis. Thereby the x y plane of the aerial scene (scanned ground area) is projected into the x' y' plane of the image area as shown in FIG. 2. Straight lines which extend parallel to the y-axis in the scene being photographed are reproduced in the plane of the image (FIG. 2) as straight lines inclined to the y-axis according to the perspective of the reproduction. At the same time they represent, in each case, the geometric location of a picture element (pel), (here the path along which the pel moves in the image) during movement of the camera in the direction of flight (see FIG. 1).

The dependence of the positions of a pel of the time, that is its shift from frame to frame is determined by the displacement geometry within the frame sequence. It can be approximated in a simplified manner, as in FIG. 3, by straight lines. If the positions of two pels (reference points) are known in two successive frames O and N actually transmitted, for example the pels $A_O$, $B_O$ in frame O and $A_N$, $B_N$ in frame N according to FIG. 3, it is possible to calculate the positions for pels the rest of the image field, for example for the image points $C_O$, $C_N$, from the relationship of the distances between the image points by means of the Ray Ratio Law.

The relationship between the object-equivalent image pels $C_O$ and $C_N$ and their coordinates $x'_{CO}$, $y'_{CO}$ or $x'_{CN}$, $y'_{CN}$ in the frames O and N respectively and the corresponding pel $C_n$ with the coordinates $x'_{Cn}$, $y'_{Cn}$ in a frame n to be regenerated are characterised by means of a straight connecting line, specific for this pel between the frames O and N.

Figure 3:
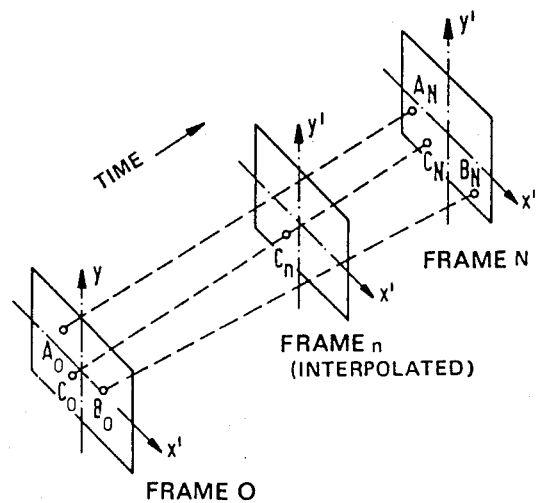
FIG. 3 shows the principle of the reconstruction of intermediate frames.

The relationship between the y' and x' coordinates of the corresponding locations, $C_n$, $C_O$ and $C_n$, $C_N$ in FIG. 3 can be expressed by the linear equations $$y'_{CO} = h_1 y'_{Cn} + h_2, \quad (1)$$

$$x'_{CO} = g_1 x'_{Cn} + g_2 \quad (2)$$

and $$y'_{CN} = h_3 y'_{Cn} + h_4, \quad (3)$$

$$x'_{CN} = g_3 x'_{Cn} + g_4 \quad (4)$$

the coefficient $h_1$ to $h_4$ and $g_1$ to $g_4$ can be calculated from the known pel locations $A_O$, $A_N$ and $B_O$, $B_N$ where $h_i$ (i=1, 2, 3, 4) is constant for each given n (that is within each frame) and $g_i$ (i=1, 2, 3, 4) is constant for each given value of $y'_{Cn}$ (that is within each frame line) (see hereinafter).

The chosen form of the algorithms represented by the equations (1) to (4) is oriented to processing in real time, taking into account a line- and frame-sequential scan format and is thus particularly suitable to the technical realisation of the method.

The algorithms are obtained on the basis of the elementary geometrical relations of the Ray Ratio Law.

Once the locations $C_O$ and $C_N$ with the sample values (intensities) $S_{CO}$ and $S_{CN}$ in the reference frames O and N, respectively, have been determined, the value $S_{Cn}$ at the present location $C_n$ in the frame n can be regenerated by the interpolation $$S_{Cn} = 1/N[(N-n)S_{CO} + nS_{CN}] \quad (5)$$

where $0 \leq n \leq N$, or, using the sample values from only one frame, by the extrapolation $$S_{Cn} = S_{CO} \quad (6a)$$

or $$S_{Cn} = S_{CN} \quad (6b).$$

Equation (5) indicates that, in the interpolated image sequence, i.e. as n increases, due to the progressively decreasing and increasing weighting factor of $S_{CO}$ and $S_{CN}$, respectively, the intensities of the frame O fade out whereas those of the frame N fade in. This becomes obvious when interpolating between non-movement-compensated scene content, such as objects moving against the scene background, or channel error effects, as described below.

The extrapolation is of interest, for example, in picture parts with non-overlapping scene content between one transmitted frame and the next. Then the coordinate values found from the equations (1) to (4) would exceed the limit of the active image area $$-\frac{b}{2} \geq y'_{CO}, y'_{CN} \leq \frac{b}{2}, \quad (7)$$

$$-\frac{a}{2} \geq x'_{CO}, x'_{CN} \leq \frac{a}{2}$$

as it occurs, for example, at the top and the bottom of a vertically moving scene.

In other cases an extrapolation may be convenient instead of the interpolation, for example when the correlation between the reference frames can temporarily be determined only inaccurately.

Object movements within the scene do not appear in a frame (or partial frame) sequence regenerated by extrapolation, while in interpolation, in general these are characterised by a gradual decrease in the intensity. This case, where the interpolation is not based on object-equivalent pels, corresponds in its effect to a fading of the positions of the moving object in consecutive frames transmitted.

The relationships are similar in channel errors. Changes in the sample value of a reference frame caused by channel error increase gradually in the interpolated frame sequence, that is within N frames, and subsequently fade in a corresponding manner.

The corresponding locations of two reference points $A_O$, $A_N$ and $B_O$, $B_N$ (representing two object-equivalent image points) in each of the two successive transmitted frames O and N—the minimum number of reference points necessary for carrying out the method—can be determined by means of an image correlation method or from measured data of the aircraft known on the receiving side. In order to increase the reliability of decision it is possible to determine the corresponding locations for other pels with subsequent selection according to predetermined criteria (for example, criteria of reliability or majority). If the corresponding locations of the reference points correlation are determined especially for the region of an object moving within the scene, then it is also possible to determine object equivalent pels for interpolation within such regions and the course of movement can thus be reproduced directly instead of by means of an increase or decrease in the intensity as described hereinbefore.

The coefficients $h_i$ and $g_i$ (i=1, 2, 3, 4) used in equations (1) to (4) are defined as follows. The chosen distribution of the equations offers advantages for the course of the calculation operations in a hardware.

$$h_1 = \frac{N}{N - n \cdot l_1} \quad (9a)$$

$$h_2 = \frac{-n \cdot l_2}{N - n \cdot l_1} \quad (9b)$$

$$h_3 = \frac{N(l - l_1)}{N - n \cdot l_1} \quad (9c)$$

$$h_4 = \frac{(N - n)l_2}{N - n \cdot l_1} \quad (9d)$$

$$g_1 = \frac{1 - k_1 y'_{CO}}{1 - k_1 y'_{Cn}} \quad (10a)$$

-continued $$g_2 = \frac{k_2(y'_{CO} - y'_{Cn})}{1 - k_1 y'_{Cn}} \quad (10b)$$

$$g_3 = \frac{1 - k_1 y'_{CN}}{1 - k_1 y'_{Cn}} \quad (10c)$$

$$g_4 = \frac{k_2(y'_{CN} - y'_{Cn})}{1 - k_1 y'_{Cn}} \quad (10d)$$

The denominator is equal in each of the equations for the $g_i$ and $h_i$ coefficients, and the substitutions in these equations are:

$$l_1 = 1 - \frac{y'_{AN} - y'_{BN}}{y'_{AO} - y'_{BO}} \quad (11a)$$

$$l_2 = y'_{BN} - y'_{BO}(1 - l_1) \quad (11b)$$

and $$k_1 = \frac{d_A - d_B}{d_A y'_{AN} - d_B y'_{BN} + x'_{BN} - x'_{AN}} \quad (12a)$$

$$k_2 = d_A(1 - k_1 y'_{AN}) + k_1 x'_{AN} \quad (12b)$$

where $$d_A = \frac{x'_{AN} - x'_{AO}}{y'_{AN} - y'_{AO}} \quad (12c)$$

$$d_B = \frac{x'_{BN} - x'_{BO}}{y'_{BN} - y'_{BO}} \quad (12d)$$

The coordinates appearing in these equations are the known coordinates of the reference points $A_O(x'_{AO}, y'_{AO})$ and $A_N(x'_{AN}, y'_{AN})$ or $B_O(x'_{BO}, y'_{BO})$ and $B_N(x'_{BN}, y'_{BN})$.

With respect to real time processing, the form of the equations (11a)–(12d) is such that they require a numerical evaluation once per reference frame interval, the equations (9a)–(9d) once per frame interval, and the equations (10a)–(10d) once per line interval.

The values of $h_i$ are to be determined once per vertical period (duration of one frame) and the values of $g_i$ once per horizontal period (duration of a line) of the video signal. Via the equations (1) or (3)—in combination with equations (10a–10d)—$g_i$ is depending on $h_i$.

The values of $l_1$, $l_2$; $k_1$, $k_2$; $d_A$ and $d_B$ must be determined once per N vertical periods.

Figure 4:
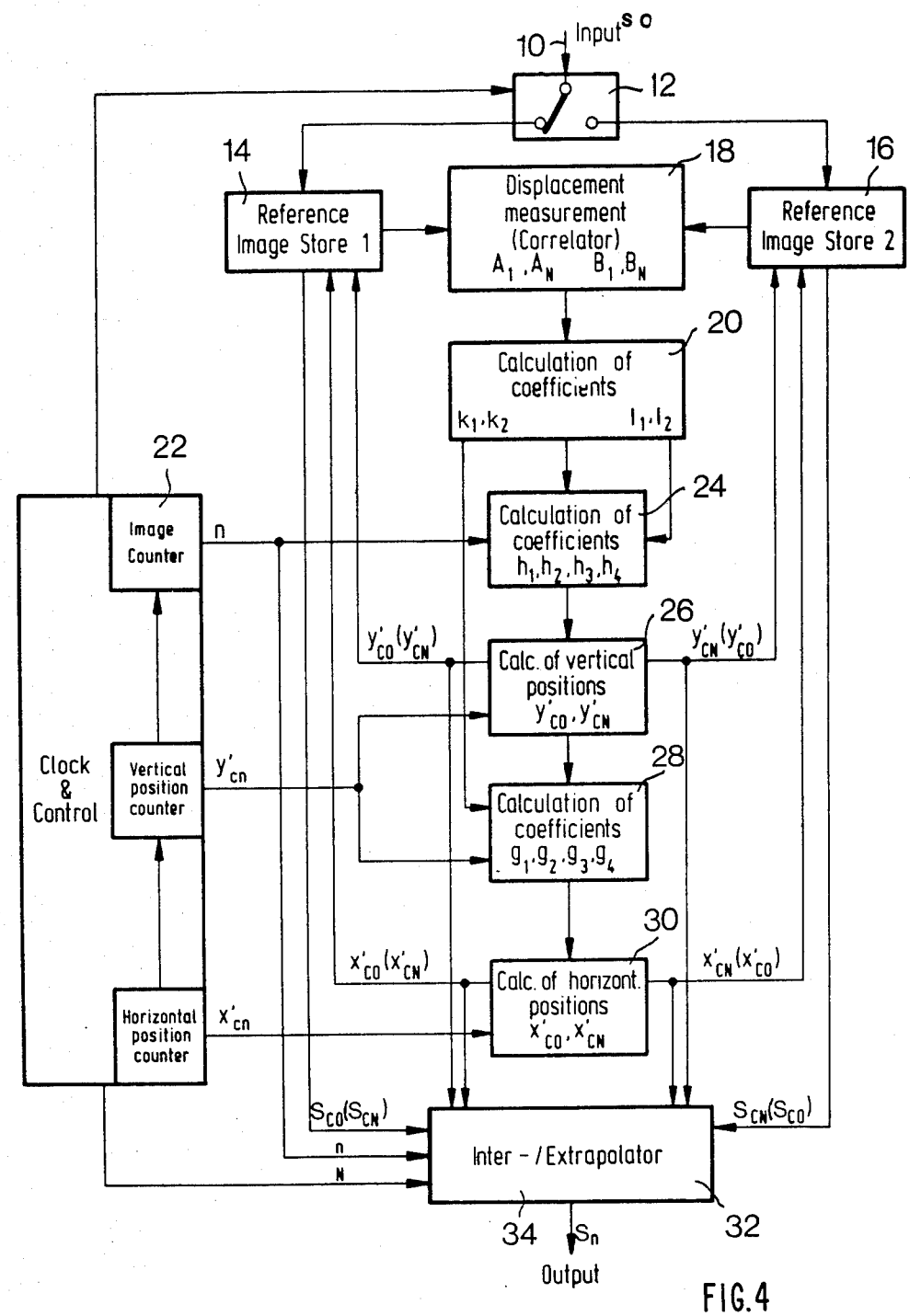
FIG. 4 is a block diagram of an apparatus for carrying out the method in accordance with the present invention.

An embodiment of the present invention which implements the calculations of the equations referred to above is shown in a block diagram in FIG. 4.

Signal samples of a picture frame (image), each of which samples representing the intensity of a pel are applied on input line 10. Via a switching device 12 the samples of successive picture frames are alternatively stored in one of two reference frame or image stores 14, 16. The switching device is actuated each time the samples of a full frame have been stored in one of the stores.

It be assumed that the samples of the earlier frame O are stored in store 14. After actuating the switching device the next frame transmitted will be read in into store 16.

By means of a correlator 18 for two pels out of frame O, namely $A_O$ with the coordinates $x'_{AO}$ and $y'_{AO}$ and $B_O$ with the coordinates $x'_{BO}$ and $y'_{BO}$ the related pels $A_N$ with coordinates $x'_{AN}$ and $y'_{AN}$ and $B_N$ with coordinates $x'_{BN}$ and $y'_{BN}$ are detected. From these coordinates coefficients $k_1$, $k_2$ and $l_1$, $l_2$ are calculated according to equations (11a, 11b) and (12a–12d) by calculating means 20.

The position of each pel is determined by their coordinates n, $y'_{Cn}$ and $x'_{Cn}$ in respect of time and its vertical and horizontal position. The actual values of these coordinates are provided by a clock and control unit 22.

For each intermediate frame n (n=1, 2, ... N−1) to be interpolated, the coefficients $h_1$, $h_2$, $h_3$, $h_4$ are calculated by calculating means 24 in accordance with equations (9a–9d). Based on these coefficients $h_1$, $h_2$, $h_3$, $h_4$ for each vertical position (line) $y'_{Cn}$ in an intermediate frame n the related positions $y'_{CO}$ in frame O and $y'_{CN}$ in frame N are calculated by calculating means 26 in accordance with equations (1) and (3).

Based on the result of this calculation by further calculating means 28 the coefficients $g_1$, $g_2$, $g_3$, $g_4$ are calculated in accordance with equations (10a–10d). Based on the result of this calculation for each pel $C_n$ with a horizontal coordinate $x'_{Cn}$ the corresponding coordinate $x'_{CO}$ in frame O is calculated by further calculating means 30 in accordance with equation (2) and the corresponding coordinate $x'_{CN}$ in frame N in accordance with equation (4).

The values $S_{CO}$ and $S_{CN}$ of the intensity of the pels $C_O(x'_{CO}, y'_{CO})$ and $C_N(x'_{CN}, y'_{CN})$ respectively determined in this way are read out of the two stores 14 and 16 respectively and supplied to the interpolator-/extrapolator means 32. By these means 32 will be tested whether the calculated values of the coordinates are within the limits given by the equations (7) and (8) and decide thereafter whether the pel $C_n$ to be issued can be or is to be interpolated in accordance with equation (5) or is to be extrapolated in accordance with equations (6a–6b). In the case of interpolation the weighting coefficients n/N and (N−n)/N are to be calculated. The values of the intensity $S_n$ for each pel $C_n$ thus determined will then be supplied to output line 34 and a displaying and/or recording means.

In the way described all intermediate frames n=1, 2 ... N are reconstructed. The last frame n=N is identical with the frame stored in store 16. When this frame N is read out of the store 16 the next frame actually transmitted is to be read in into the store 14. With the frame in store 16 now being frame O the cycle described above is repeated.

The calculations are carried out by the different calculating means in a manner known to those skilled in the art.

The method described is, in principle, also applicable when the relationship of pels is described within the temporal sequence by means of the exact equations of the frame geometry instead of by the simpler linear model.

In addition to the interpolation or extrapolation of the frame-to-frame displacement for the whole scene described, a corresponding interpolation or extrapolation may take place for predetermined areas of the frames, for example for objects moving in front of the background, for which it is then necessary to determine the suitable reference points independently or, in general, in order to increase the exactness of the reproduction and/or contrast of individual parts of the image.

The method can, fundamentally, also be used for other purposes with relative movement between a pickup sensor and a scene.

Depending on the number of intermediate frames, the projection may occur at the original velocity, with quick motion effect, or with slow motion effect.

The quality of reproduction of the intermediate frames inserted into the sequence of transmitted frames by the method described above is in particular depending on the accuracy of the discrete frame representations, the accuracy of the mathematical picture model used for the reconstruction of the intermediate frames and the accuracy of calculations. Depending on the expenditure for realisation there are quality restrictions appearing in a smoothing of steep grey value transitions (reduction of the detail contrast) and edge business, which may affect the recognizability and thus the possibility to evaluate picture details.

Evaluation of picture detail may be improved without substantially increasing the expenditure by each time displaying the first of two transmitted frames as a still picture presentation for a given period of time, said presentation being followed by a series of intermediate frames being reproduced in accordance with the method described above.

The term "still picture" means the reproduction of a frame without changing frame elements. The presentation of the still picture is typically effected by repeating the reproduction of the stored transmitted frame O with the frame rate of the chosen video standard.

During the still picture presentation for a given period the frame is not subjected to the restriction mentioned above. Thus the operator can concentrate on details of the picture (e.g. details of a target) during the still picture representation. The following presentation of moving pictures has the purpose to transfer the operator with little symptoms of fatigue to the next transmitted frame represented again as a still picture. It enables him also to realize possible movements of objects on the background of the image. The operator can readily track areas of interest, especially if there is large displacement between successive transmitted frames. In general this avoids loss of time for searching in the next picture for the corresponding area of interest. By the possibility to obtain detailed information during the still picture period or phase given restrictions in reproduction quality during the moving picture period are less important than in case of continuous presentation of moving pictures.

When using this kind of representation in real time, the moving picture period is presented in quick motion, since the time available for presentation of the frames is shorter than the normal number of reconstructed intermediate frames, in this case shorter than the time interval between two transmitted frames. For example, if the moving picture period may be 1 second out of 4 seconds chosen as interval between two successive transmitted frames (corresponding to a rate of 0.25 transmitted frames per second), then the duration of still picture period is 3 seconds.

In case of extremely quick motion representation during the moving picture period, it may be advisable to display the scene movement starting with slowly increasing speed and terminating with slowly decreasing speed instead of displaying with constant speed. A slowly increasing and decreasing of the speed of the scene movement is subjectively more advantageous for the observing operator compared with an instant start and stop of the scene movement. The speed can be made variable according to a triangular, trigonometric (e.g. sine; cosine) or exponential or an polynomial time function.

Also the duration of the still picture period can be variable. It is possible to realize the implementation in such a way that the operator can optionally select still picture presentation, e.g. if it is desired to recognize details more clearly. It is possible to select a still picture period either manually or automatically. An automatic selection may be done e.g. depending on predetermined frame elements. If successive transmitted frames are sufficiently overlapping, it is possible to extend the still picture period over the duration of a normal transmission period by ignoring one or more transmitted frames, i.e. operating with a greater frame-to-frame interval, e.g. by suppressing every second frame.

The ratio of the duration of the still picture period and the duration of the moving picture period can be chosen differently for individual frame areas. In particular the still picture presentation may be restricted to an area of the frame, e.g. an area in the center of the picture, while the rest of the picture is represented moving.

Optionally it is possible to increase or decrease the time of presentation for a whole scene presentation compared with the operation in real time. In particular it is possible to extend the time for the scene presentation proportional to the duration of the still picture period, in order to display the moving picture period at the speed of the real time operation, i.e. without quick motion.

What we claim as our invention and desire to secure by Letters Patent of the United States is:

1. A method for the representation of video image sequences or scenes with a relative movement between a pick-up sensor and the viewed scene, such scenes being transmitted at reduced frame rate, comprising the steps of:
    (a) transmitting first and second video image frames,
    (b) selecting a small number of object points in the first transmitted frame, at least two of said object points being situated on different coordinates,
    (c) determining corresponding object points on the second transmitted frame by correlation,
    (d) determining the object point displacement between the two transmitted frames by a predetermined mathematical model,
    (e) reconstructing an intermediate frame for each object point by calculating corresponding object points in the first and second transmitted frames by displacement geometry, and
    (f) determining a sample value for the object points of the first and second frames and corresponding sample value and picture elements of the intermediate frame by interpolation or extrapolation.

2. A method for the representation of video image sequences according to claim 1, wherein the model for determining object point displacement between the transmitted frames is based on the linear relationship of object points in the transmitted and intermediate frames.

3. A method for the representation of video image sequences according to claim 1, comprising the further step of representing one of said first or second transmitted frames as a still picture for a period of time followed or preceded by a series of reconstructed intermediate frames in order to provide a moving picture.

4. A method for the representation of video image sequences according to claim 3, comprising the further step of representing the reconstructed intermediate frame at the beginning with slowly increasing speed of movement, and towards the end with decreasing speed of movement.

5. A method for representation of video image sequences according to claim 3, wherein the length of said still picture period is variable.

6. A method for representation of video image sequences according to claim 3, wherein only partial area or partial areas of the intermediate frame is represented as a still picture.

7. An apparatus for the reproduction of video scenes transmitted at reduced frame rates, comprising storage means for alternately storing the transmitted frames, correlation means for detecting the locations of a small number of distinctive corresponding reference points in said stored frames, at least two of said reference points being situated at different locations, means for calculating auxilliary coefficients from the locations of said reference points, means for calculating the vertical and horizontal positions in the stored frames for each picture element in an intermediate frame to be reconstructed from said reference points, and means for interpolation and/or extrapolation of the intensity of each picture element of said intermediate frame.

* * * * *